J. E. COX.
SYRINGE.
APPLICATION FILED MAY 20, 1915.
1,197,266.
Patented Sept. 5, 1916.
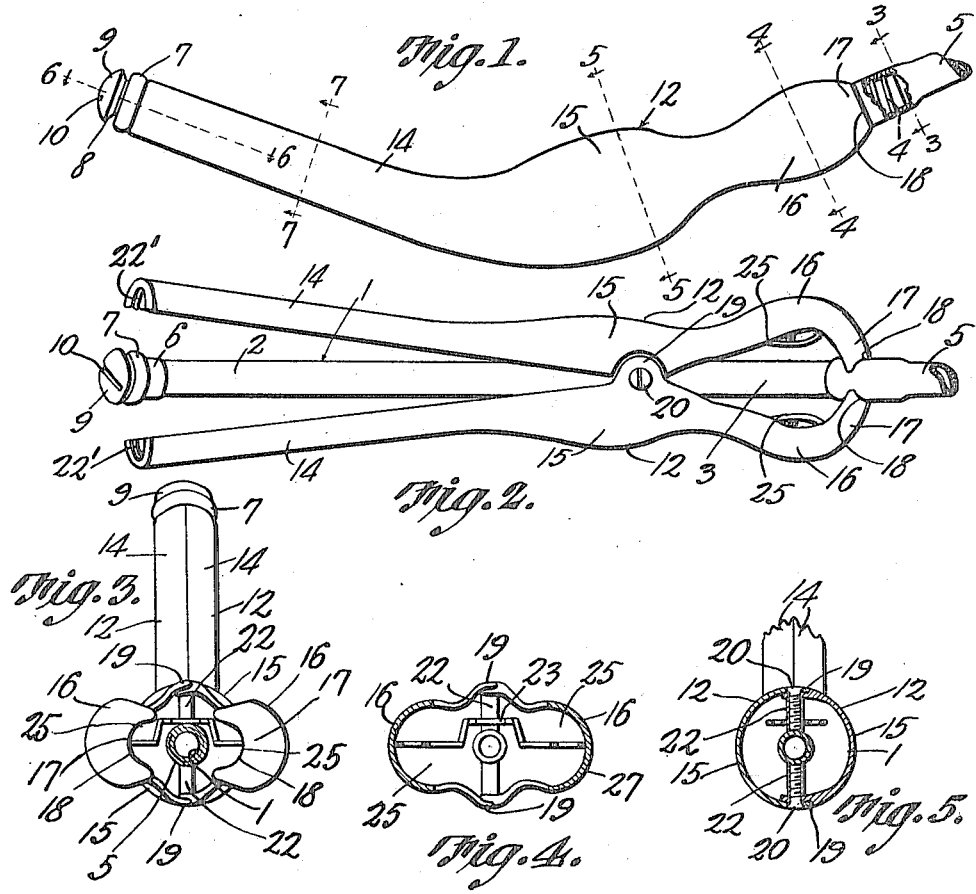
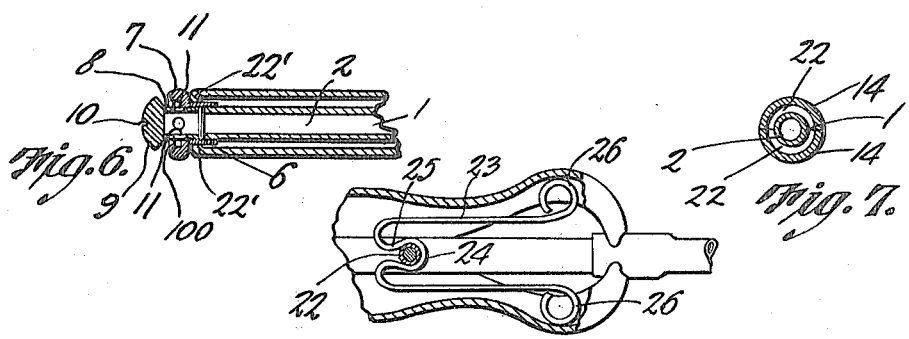
Witnesses
J. E. Cox  Inventor
by  Attorneys

UNITED STATES PATENT OFFICE.

JULIUS E. COX, OF CHICAGO, ILLINOIS, ASSIGNOR OF ONE-HALF TO JOSEPH F. BROWN, OF CHICAGO, ILLINOIS.

SYRINGE.

1,197,266.     Specification of Letters Patent.     Patented Sept. 5, 1916.

Application filed May 20, 1915.  Serial No. 29,394.

*To all whom it may concern:*

Be it known that I, JULIUS E. Cox, a citizen of the United States, residing at Chicago, in the county of Cook and State of Illinois, have invented a new and useful Syringe, of which the following is a specification.

The device forming the subject matter of this application is a combined dilator and syringe, and the invention aims to provide a device of this type so shaped that it may readily be adapted for the purposes for which it is intended, this feature being carried out by providing a nozzle comprising angularly disposed parts, and by providing opposite dilating jaws comprising angularly disposed parts coöperating with the respective parts of the nozzle, the jaws being pivotally assembled with the nozzle.

A further object of the invention is to provide novel means for controlling the flow of liquid through the nozzle.

Another object of the invention is to provide novel means whereby the jaws may be normally held closed upon the nozzle.

A further object of the invention is to provide novel means for holding the jaws rigid when the same are in open positions, and to provide novel means for cushioning the opening movement of the jaws.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing: Figure 1 shows the invention in side elevation, parts being broken away; Fig. 2 is a top plan wherein the jaws appear in open position; Fig. 3 is a cross section on the line 3—3 of Fig. 1, looking forwardly; Fig. 4 is a cross section on the line 4—4 of Fig. 1, distant parts being omitted; Fig. 5 is a cross section on the line 5—5 of Fig. 1, distant internal parts being omitted; Fig. 6 is a fragmental longitudinal section; Fig. 7 is a cross section on the line 7—7 of Fig. 1; Fig. 8 is a fragmental longitudinal sectional view showing in detail the actuating spring.

In carrying out the present invention there is provided a nozzle in the form of a tube or pipe 1 comprising angularly disposed parts 2 and 3, the part 3 preferably being ribbed or otherwise roughened near its end, as indicated at 4, to receive and hold one end of a supply tube 5 which may be made of rubber, any suitable means (not shown) being provided for supplying liquid to the device forming the subject matter of this application.

Secured in any desired manner to the discharge end of the part 2 of the nozzle 1 is a tubular discharge head 6 provided with an outstanding rim 7. A movable closure for the discharge head 6 is provided, the same preferably being of tubular form and being indicated by the numeral 8, the closure 8 being threaded into the discharge head 6 for adjustment, and including a terminal cap 9 which may be provided with a screw driver kerf 10. In the side wall of the closure 8, one or more openings 11 are provided. Through these openings 11, the liquid traversing the nozzle 1 escapes, and it will be understood that by rotating the closure 8, the openings 11 may be closed, wholly or in part, thereby to regulate the amount of liquid discharged. As shown at 100, the rim 7 is countersunk, the cap 9 being beveled to coöperate with the countersunk portion of the rim. When the cap 9 is advanced as shown in Fig. 6, liquid escapes through the openings 11 by way of the countersunk part 100 of the rim. The closure 8 may be adjusted to assume any desired position, depending upon the force with which the liquid is discharged. The closure 8 may be brought into abutment with the end of the nozzle 1, the head 6 and its rim 7 acting as a jam nut for holding the part 8 in position, the discharge head 6 preferably being threaded onto the nozzle 1.

The invention further includes a pair of dilating jaws 12, located upon opposite sides of the nozzle 1. The jaws 12 as will be understood from Fig. 1, are shaped to correspond with the angularly disposed portions 2 and 3 of the nozzle 1. The jaws comprise trough-shaped ends 14, enlarged, intermediate body portions 15, and handles 16 having approaching ends 17, the ends 17 of the handles 16 being provided with notches 18 which coact with the supply tube 5 and with the end portion of the part 3 of the nozzle 1, when the jaws are opened. Owing to the manner in which the notches 18 coöperate with the parts above mentioned, the jaws remain firmly held in position, when opened as shown in Fig. 2, it being impossible for the jaws to slip and strains upon the pivot elements 20 (hereinafter described) being avoided. Further, since the ends of the handles 16 abut against the supply tube 5, which preferably is resilient, the supply tube acts as a cushion for the handles during the opening movement of the jaws. Owing to the fact that the jaws are enlarged to form the body portions 15, the said parts 15 act as a closure for the external part of the organ into which the device forming the subject matter of this application is inserted. The jaws 12 are provided intermediate their ends with overlapped ears 19 receiving pivot elements 20 which may be screws, the pivot elements 20 being threaded into tubes 22 projecting radially from the nozzle 1. The heads of the pivot screws 20 are countersunk, for the obvious purpose of preventing any projections upon the exterior of the device, which projections would interfere with the insertion of the instrument, as will be obvious to those skilled in the art.

When the handles 16 are pressed together, the same move in a common plane with the parts 3 of the nozzle 1, and when the trough-shaped ends 14 of the jaws swing to open position, as shown in Fig. 2, these ends move in a common plane with the part 2 of the nozzle 1. The general angular form of the device, as clearly shown in Fig. 1 renders the structure readily manipulated and inserted into the vagina. Adjacent their free ends, the end portions 14 of the jaws 12 may be provided with inwardly projecting ribs 22', which coacting with the nozzle 1, serve to space the end portions 14 apart from the nozzle 1, as will be evident when the cross sectional figure numbered 7 is examined. The parts thus are so constructed and arranged that when the end portions 14 of the jaws are closed down upon the part 2 of the nozzle, the elements in question may be sterilized readily.

For the purpose of maintaining the end portions 14 of the jaws 12 closed against the nozzle 1 there is provided an M-shaped spring comprising arms 23 and an intermediate loop 24, the latter being engaged around one of the tubes 22 and being provided with a restricted throat 25 which aids in holding the spring in place. The arms 23 terminate in circular eyes 26 bearing slidably against the inner surfaces of the handles 16, as clearly shown in Fig. 8, the circular form of the eyes 26 facilitating the sliding engagement between the said parts and the handles 16. It is to be understood that, if desired, the instrument may be used without the spring above alluded to, the construction being such that the spring may be removed easily, and without the use of tools.

The device preferably is fashioned from aluminum throughout, with the possible exception of the tube 5, and therefore, rust and consequent deterioration are prevented.

It is to be understood that the device may be used without resorting to the dilating feature dependent upon an opening of the jaws 12. Whether the instrument be used as a dilator, or be otherwise employed, it is at all times under the control of the user, and but one hand is necessary for its manipulation. In similar instruments so far as I am advised as to the state of the art, the user cannot so conveniently regulate the amount of dilation. Especial attention is directed to the fact that there are no protruding wires or other prominent parts tending to injure the organ into which the device is inserted.

Having thus described the invention, what is claimed is:—

1. In a device of the class described, a nozzle comprising angularly disposed parts located in a common plane; and a pair of dilating jaws disposed upon opposite sides of the said plane, each jaw comprising angularly disposed parts corresponding to the angularly disposed parts of the nozzle; and means for pivotally connecting the jaws intermediate their ends to the nozzle whereby when the jaws are open and closed, the parts of the jaws will move in common planes with the respective parts of the nozzle and transversely of the said plane.

2. In a device of the class described, a nozzle; a pair of jaws located upon opposite sides of the nozzle; a pivot member uniting the jaws intermediate their ends with the nozzle; and an M-shaped spring embodying an intermediate portion having a reduced throat adapted to receive the pivot member detachably, the spring including rearwardly extended arms engaging the inner faces of the jaws to the rear of the pivot member.

3. In a device of the class described, a nozzle; jaws located on opposite sides of the nozzle and pivotally assembled therewith; a tubular discharge head surrounding the end of the nozzle; a tubular closure in the head alined with the nozzle, the closure including an end cap coöperating with the head, the closure having a lateral opening; the closure being threaded into the head, whereby the end of the closure may be made to abut against the end of the nozzle, and the head being threaded onto the nozzle, whereby the head may constitute a jam-nut adapted to hold the closure engaged with the end of the nozzle.

4. In a device of the class described, a nozzle; a closure alined with the end of the nozzle and having an opening in its side wall; and a discharge head threaded exteriorly onto the nozzle and the closure and adapted to be advanced therealong, to control the effective area of the opening; and jaws assembled with the nozzle and operating on opposite sides of the nozzle.

In testimony that I claim the foregoing as my own, I have hereto affixed my signature in the presence of two witnesses.

JULIUS E. COX.

Witnesses:
FRANK J. DALEY,
WM. BRENNAN.